United States Patent
Petellaz et al.

(10) Patent No.: US 9,840,921 B2
(45) Date of Patent: Dec. 12, 2017

(54) BLADE ANCHORED SECURELY IN RADIAL TRANSLATION, PROPELLER, TURBINE ENGINE AND AIRCRAFT

(71) Applicant: RATIER FIGEAC, Figeac (FR)

(72) Inventors: Bruno Petellaz, Beduer (FR); Catherine Delmas, Capdenac-Gare (FR); Stanislas Tutaj, Faycelles (FR)

(73) Assignee: RATIER FIGEAC, Figeac (FR)

( * ) Notice: Subject to any disclaimer, the term of this patent is extended or adjusted under 35 U.S.C. 154(b) by 280 days.

(21) Appl. No.: 14/712,094

(22) Filed: May 14, 2015

(65) Prior Publication Data
US 2015/0330233 A1      Nov. 19, 2015

(30) Foreign Application Priority Data
May 14, 2014   (FR) ...................... 14 54283

(51) Int. Cl.
| | |
|---|---|
| *F01D 5/30* | (2006.01) |
| *B64C 11/06* | (2006.01) |
| *F04D 29/32* | (2006.01) |
| *F04D 27/02* | (2006.01) |
| *F01D 5/10* | (2006.01) |

(52) U.S. Cl.
CPC .............. *F01D 5/30* (2013.01); *B64C 11/06* (2013.01); *F01D 5/10* (2013.01); *F04D 27/0292* (2013.01); *F04D 29/322* (2013.01); *F05D 2220/30* (2013.01); *Y10T 29/49337* (2015.01)

(58) Field of Classification Search
CPC . F01D 5/10; F01D 5/30; F01D 5/3032; F01D 5/3053; F01D 5/3092; F01D 5/32; B64C 11/06; F04D 29/322
See application file for complete search history.

(56) References Cited

U.S. PATENT DOCUMENTS

| | | | |
|---|---|---|---|
| 1,769,801 A | * 7/1930 | McCauley | ............ B64C 11/065 |
| | | | 416/207 |
| 3,734,642 A | 5/1973 | Dixon | |
| 4,626,172 A | * 12/1986 | Mouille | ............. B29D 99/0025 |
| | | | 416/134 A |

(Continued)

FOREIGN PATENT DOCUMENTS

| | | |
|---|---|---|
| EP | 2 677 121 A2 | 12/2013 |
| FR | 2 984 847 A1 | 6/2013 |

OTHER PUBLICATIONS

FR Search Report, dated Jan. 9, 2015, from corresponding FR application.

*Primary Examiner* — Nathaniel Wieh
*Assistant Examiner* — Elton Wang
(74) *Attorney, Agent, or Firm* — Young & Thompson (57) ABSTRACT

A blade includes an aerodynamic portion (21) and an assembly of the aerodynamic portion to a blade shank retaining the aerodynamic portion in a radial direction (23). The blade shank includes at least one passage restriction in at least one retention direction orthogonal to the radial direction, having a restricted width allowing the aerodynamic portion (21) to pass through. The base of the aerodynamic portion (21) has an overall dimension which is strictly greater than the restricted width so that, in the event of rupture of the assembly, the base is able to come into abutment against the passage restriction so as to retain the aerodynamic portion (21) in the blade shank (20).

25 Claims, 3 Drawing Sheets

(56) References Cited

U.S. PATENT DOCUMENTS

| | | | | |
|---|---|---|---|---|
| 5,102,300 A | * | 4/1992 | Violette | B64C 11/04 |
| | | | | 416/131 |
| 5,374,145 A | * | 12/1994 | Mairesse | F01D 5/3023 |
| | | | | 29/525.11 |
| 6,102,664 A | * | 8/2000 | Nguyen | F01D 5/26 |
| | | | | 416/248 |
| 2012/0195762 A1 | * | 8/2012 | Bianchi | B64C 27/48 |
| | | | | 416/214 R |
| 2013/0164142 A1 | * | 6/2013 | Tutaj | B64C 11/24 |
| | | | | 416/226 |
| 2014/0271200 A1 | * | 9/2014 | Sutton | B64C 27/32 |
| | | | | 416/134 A |

\* cited by examiner

BLADE ANCHORED SECURELY IN RADIAL TRANSLATION, PROPELLER, TURBINE ENGINE AND AIRCRAFT

FIELD OF THE INVENTION

The invention relates to a blade, especially a blade of a rotating machine, especially of a turbine engine. The invention relates also to a method of assembling such a blade.

The invention relates more particularly to a propeller blade for propelling and/or lifting an aircraft and/or for control during turning. The invention relates also to a propeller, especially an aircraft turbine engine propeller, comprising at least one blade according to the invention, as well as to a turbine engine and an aircraft.

In particular, the invention proposes a propeller blade, the fixing of which in a propeller hub is improved and especially made secure.

BACKGROUND OF THE INVENTION

A propeller blade is fixed in a propeller hub by the blade shank, which has means for anchoring in the hub according to a longitudinal axis of the blade, therefore according to a radial axis of the hub. Often, the blade shank comprises an anchoring bushing, which provides a mechanical connection and anchoring in the hub, and a means of fixing to the aerodynamic portion of the blade.

In addition, turbine engine blades are subjected to very considerable forces, so that the assembly of the aerodynamic portion to the blade shank must be sufficiently strong to retain the blade in the hub, transmit the movement of the hub to the blades, and transmit the forces of the blades to the hub (especially propulsion of the aircraft).

The blade shank and more particularly the anchoring bushing and the means of fixing the aerodynamic portion to the blade shank are therefore subjected to high stresses—especially during high acceleration—and to high levels of vibration. Furthermore, they are subject to considerable forces in a continuous and sustained manner during long flights, and to impacts in the event of collisions of a blade with a bird, for example.

In the event of rupture of the assembly of the aerodynamic portion in the blade shank while the propeller is rotating, part of the blade is sometimes freed, which can have serious consequences for the aircraft and its occupants, or for people and buildings on the ground.

U.S. Pat. No. 3,734,642 describes a blade, a spar of which is adhesively bonded between a first tapered sleeve and a second tapered sleeve. The second sleeve is bolted to a hub. In the event of rupture of the connection between the spar and the second sleeve, the spar is retained relative to the hub by means of a shoulder of the first sleeve, which is adapted to cooperate with a shoulder of the second sleeve.

However, the manufacture and mounting of such a blade are complex and therefore lengthy and expensive, because complex adhesive bonding must be carried out between the spar and the sleeves. Furthermore, such a blade is incompatible with modern blades, which generally allow the pitch of the blade to be adjusted in flight. Moreover, the costs and maintenance times of such a blade are high. In fact, inspection or replacement of the aerodynamic portion require the blade to be dismantled completely relative to the hub. In particular, the condition of the portion of the spar that extends into the blade shank cannot be evaluated by non-destructive means.

The invention therefore aims to remedy these disadvantages.

SUMMARY OF THE INVENTION

The invention aims to propose a blade in which anchoring of the aerodynamic portion in the blade shank is ensured even in the event of rupture of the main assembly of the aerodynamic portion in the blade shank.

The invention aims also to propose such a blade which can be mounted simply and rapidly.

The invention relates in particular to such a blade which is simple to maintain.

The invention aims to propose such a blade which is safe and reliable.

The invention further aims to propose such a blade which is easy to manufacture.

The invention aims also to propose such a blade whose weight and cost are not modified substantially by the technical solution that ensures secure anchoring in the event of rupture.

Throughout the text, "extrados" in the conventional manner denotes one of the two main faces of a blade that is adapted to create an aspiration of the blade by the air flowing along the extrados, from the leading edge to the trailing edge of the blade. Likewise, "intrados" denotes the main face opposite the extrados, which is adapted to create a thrust of the blade by the air flowing along the intrados, from the leading edge to the trailing edge of the blade.

Throughout the text, "chord" denotes a direction passing through the leading edge and the trailing edge of the blade. Likewise, "longitudinal" denotes a direction substantially parallel to a straight line connecting the blade shank to the free end of the blade. The "span" of the blade represents the maximum distance between the blade shank and the free end of the blade. In addition, "thickness" denotes the distance at any point between the extrados and the intrados.

Accordingly, the invention relates to a blade comprising:
  a blade shank,
  an aerodynamic portion, part of which, named the base, extends into the blade shank,
  an assembly, named the blade shank assembly, of the aerodynamic portion to the blade shank which retains the aerodynamic portion in a direction, named the radial direction, corresponding to a centrifugal direction when the blade is driven in rotation with the blade shank anchored to a rotating hub,
characterised in that:
  the blade shank is adapted to be able to have a mounting opening having a dimension, named the opening width, in any tangential direction orthogonal to the radial direction, which is greater than an overall dimension of the base, so that the base can be mounted in the blade shank by being passed in the radial direction through the mounting opening,
  the blade shank comprises at least one passage restriction forming a restriction of the opening width in at least one direction, named the retention direction, orthogonal to the radial direction, said passage restriction having, in said retention direction, a dimension, named the restricted width, allowing a section of the aerodynamic portion to be housed,
  the base of the aerodynamic portion extends radially on the inside relative to said passage restriction and has an overall dimension in said retention direction which is strictly greater than said restricted width, so that, in the event of rupture of the blade shank assembly, the base is able to come into abutment in said radial direction against the passage restriction so as to retain the aerodynamic portion in the blade shank at least in said radial direction.

Throughout the text, "radial" accordingly denotes a radial direction relative to a rotating axis of a hub in which the blade according to the invention is to be mounted by the blade shank, corresponding to the direction of the centrifugal forces. An element situated on the side of the hub in a radial direction of the hub is therefore described as being "radially inner" or "proximal", and an element situated on the opposite side of the hub in a radial direction of the hub is described as being "radially outer" or "distal".

In a blade according to the invention, the base extends radially on the inside (on the proximal side) relative to a passage restriction of the blade shank, while the aerodynamic portion extends through the passage restriction and radially on the outside of said passage restriction.

In some advantageous embodiments according to the invention, the blade shank is additionally arranged so as to house the base. Accordingly, advantageously and according to the invention, the blade shank has, opposite the aerodynamic portion relative to said passage restriction (that is to say on the proximal side) and in said retention direction, a dimension, named the proximal width, which is greater than said restricted width, and the base has an overall dimension in said retention direction which is smaller than said proximal width.

More particularly, advantageously and according to the invention, the blade shank comprises a receiving housing for the base which is delimited on the side of the aerodynamic portion by at least one passage restriction in at least one retention direction, said receiving housing having, in said retention direction, a dimension, named the width of the housing, which is greater than said restricted width, and the base has an overall dimension in said retention direction which is smaller than said width of the housing so as to be able to be housed in the receiving housing.

A passage restriction of a blade according to the invention can be formed only in a single retention direction or mainly in a single retention direction. On the other hand, a passage restriction of a blade according to the invention can be formed according to an angular sector around the radial direction, or even over an entire periphery of the blade shank. It forms a neck capable of retaining the aerodynamic portion by avoiding the centrifugal ejection thereof in the event of rupture of the blade shank assembly.

In addition, advantageously, a blade according to the invention is characterised in that:
  the blade shank has a mounting opening having a dimension, named the opening width, in any direction, named the tangential direction, orthogonal to the radial direction, which is greater than an overall dimension of the base, so that the base can be mounted in the blade shank by being passed in the radial direction through the mounting opening,
  at least one passage restriction in a retention direction is a restriction of the opening width in said retention direction.

It is to be noted that the radial direction passes through the mounting opening. The opening width is greater than an overall dimension of the base in said tangential direction so as to allow the base to pass through the opening during mounting of the aerodynamic portion, the base then being housed in the space situated radially on the inside of said passage restriction; the base is housed especially in the receiving housing formed by the blade shank.

The aerodynamic portion has an aerodynamic surface capable of exerting forces on air.

The blade shank is advantageously adapted to be able to provide radial anchoring of the blade in a hub, especially in a radial shaft of a propeller hub. However, anchoring of the blade shank in a hub is advantageously only radial in order to allow the blade to rotate about its longitudinal axis (about a radial axis of the hub) in order to allow the pitch of the blade to be adjusted on the ground and in flight, especially to be adjusted automatically by an adjusting device which is mounted in the hub of the propeller and connected to the blade shank.

Advantageously and according to the invention, the base has at least one safety protuberance which defines the overall dimension of the base in at least one retention direction. At least one safety protuberance of the base therefore extends at least in a direction in which the blade shank has a passage restriction. The base with such a safety protuberance forms an integral part of the aerodynamic portion and as such is free of mobile members. Such a safety protuberance is formed structurally by a portion of the base which is wider than the passage restriction, in the retention direction at least. Thus, a blade according to the invention does not comprise any movable or removable elements in the aerodynamic portion, so that the blade is simple to manufacture and maintain and is also less sensitive to vibrations.

Advantageously and according to the invention, the dimensions of such a safety protuberance are greater, in all the directions orthogonal to the radial direction, than the minimum dimension (restricted width) of the passage restriction in at least one direction orthogonal to the radial direction.

The safety protuberance and the passage restriction are adapted to be able radially to retain the aerodynamic portion in the blade shank against centrifugal forces. In particular, the safety protuberance and the passage restriction are of such a size that they are able to withstand the inertia of the aerodynamic portion in rotation, for the maximum acceleration and rotational speed, taking into account the use conditions, especially on a turbine engine propeller. The dimensions of the safety protuberance and the passage restriction are especially dependent on the material of the aerodynamic portion and on its mass, so as to ensure radial anchoring of the aerodynamic portion relative to the blade shank under flight conditions in the event of rupture of the assembly to the blade shank. In particular, the difference between a dimension of the protuberance in the retention direction and a dimension of the passage restriction, named the restricted width, is from 0.5 mm to 10 cm. It is adjusted in dependence on various criteria, including especially the dimensions of the blade, in particular its span and its thickness, its mass, its material, the shape and the material of the stops, etc.

The safety protuberance and the passage restriction are therefore capable of providing anchoring of the aerodynamic portion relative to the blade shank in the event of partial or complete rupture of the blade shank assembly.

Normal operating conditions of the blade are understood as being conditions in which the blade shank assembly is unimpaired and provides anchoring of the aerodynamic portion in the blade shank at least in said radial direction and advantageously by blocking in all the translation directions and along all the axes of rotation necessary for correct operation of the blade.

In addition, advantageously and according to the invention, the blade shank comprises, in the mounting opening:
- a first stop, named the intrados stop, arranged on the side of an intrados of the aerodynamic portion,
- a second stop, named the extrados stop, arranged on the side of an extrados of the aerodynamic portion, the intrados stop and the extrados stop forming (between them) said passage restriction.

Advantageously and according to the invention, at least one passage restriction of the blade shank is formed of at least one member—especially at least one stop—which is removably assembled to the blade shank. Thus, advantageously and according to the invention, said stops are elements which are attached to the blade shank and fixed rigidly to the blade shank. The stops are advantageously removably assembled to the blade shank.

In addition, the mounting opening, in the absence of the attached stops forming the passage restriction, is of dimensions adapted to permit the insertion of the base of the aerodynamic portion into the blade shank through the mounting opening. Accordingly, the base of the aerodynamic portion can simply be introduced through the mounting opening before the stops are fixed. Mounting of the blade is therefore simple: this feature allows the blade to be assembled simply and rapidly, both during its manufacture and for the replacement of a damaged aerodynamic portion or of a damaged blade shank.

Advantageously and according to the invention, at least one of the intrados and extrados stops is removable from outside the blade shank. Dismantling of the blade is thus also possible in a simple manner. For example, at least one of the stops is fixed to the blade shank by screws, the heads of which are in abutment on an outside face of the blade shank. Many other fixing means can be envisaged.

Advantageously, a blade according to the invention further comprises at least one member, named an intrados buffer, between the aerodynamic portion and the intrados stop, and at least one member, named an extrados buffer, between the aerodynamic portion and the extrados stop, each of said intrados and extrados buffer being adapted to provide local blocking of the aerodynamic portion at least in said retention direction.

In addition, advantageously and according to the invention, each buffer is mounted with a compressive stress between the aerodynamic portion and the corresponding one of said intrados and extrados stops, said compressive stress being adapted so that any resonance frequency of the blade is distinct from mechanical excitation frequencies under use conditions of the blade.

In particular, the material and the compressive stress are chosen so that each resonance frequency of the blade is remote from the values of the mechanical excitation frequencies under operating conditions of the blade, that is to say, for example, in flight in the case of an aircraft blade.

Said buffers allow intimate contact between each stop and a surface of the aerodynamic portion facing said stop to be ensured. Said buffers are chosen to be of a material that has sufficient local deformability to be able to compensate for any surface defect of the aerodynamic portion, especially to compensate for manufacturing tolerances in terms of flatness. This allows said compressive stress to be distributed over a surface portion of the aerodynamic portion in a homogeneous manner over that surface portion.

Furthermore, the buffers are chosen to be of a material that is adapted to be able to have a compression stiffness that is very much greater than a shear stiffness. Accordingly, they maintain the aerodynamic portion relative to the blade shank but do not prevent the blade from being displaced in the radial direction, for example under the effect of a displacement and/or a deformation in that direction when it is subject to centrifugal forces during operation, or in the event of rupture of the assembly to the blade shank.

The buffers are advantageously made of a viscoelastic material. Accordingly, the absorbent material can be chosen, for example, from elastomeric materials.

Since the material of each buffer is viscoelastic, the buffers are adapted to be able to absorb vibrations between the aerodynamic portion and each stop (intrados and extrados, respectively). The buffer (in particular the materials and dimensions thereof) and the compressive stress are in particular adapted so that any resonance frequency is remote from the frequencies of the vibrations of the blade during operation.

The material of the buffers is in particular a material whose compression stiffness is lower than the compression stiffness of the aerodynamic portion—especially of a skin forming the intrados and the extrados of the aerodynamic portion—and lower than the compression stiffness of the stops.

Said buffers can be mounted between the stops and the aerodynamic portion by different means: by adhesive bonding to a stop or to the aerodynamic portion, by simple positioning—in which case they are then held by the compressive stress and friction on the aerodynamic portion and the stop, by assembly of conjugate forms of the buffer and the stop, etc.

The mounting of each buffer between a stop and the aerodynamic portion is adapted to allow the aerodynamic portion to be dismantled relative to the stops, in particular dismantled without a particular operation of separating the buffer from the aerodynamic portion or from the stop.

In addition, a blade according to the invention advantageously further comprises, between the aerodynamic portion and each stop, a deformable member which is adapted to be able to absorb at least partially the energy of an impact to which said aerodynamic portion is subjected.

The absorbing member is adapted to absorb impacts of considerable amplitude, for example impacts of the aerodynamic portion with foreign objects such as birds, for example.

The member is formed, for example, of a layer of plastically deformable material. The layer of plastically deformable material is, for example, arranged between each buffer and each stop, or between the aerodynamic portion and each buffer, or between two portions of each stop, or between the stop and an anchoring bushing.

However, advantageously and according to the invention, the buffer is chosen to be of a viscoelastic material which is adapted to perform, in addition to the functions of the buffer which have already been described, the function of such an absorbing member.

Advantageously and according to the invention, the intrados stop and the extrados stop form a passage restriction of decreasing cross-section in the radial direction in the direction of a free end of the blade.

Furthermore, the base of the aerodynamic portion, and more particularly the safety protuberance, has a form complementary to the passage restriction. Advantageously, that form is parallelepipedal with a trapezoidal profile through a section according to a plane, named the longitudinal plane, containing the radial direction and the retention direction, so that the forces exerted by the aerodynamic portion in the radial direction are transmitted by the stops to an anchoring bushing of the blade shank in the retention direction orthogonal to the radial direction.

In addition, advantageously and according to the invention, the blade has a strictly positive (non-zero) gap in the radial direction between the safety protuberance and the passage restriction. Accordingly, under normal operating conditions of the blade, only the blade shank assembly provides radial anchoring of the aerodynamic portion in the blade shank.

Advantageously and according to the invention, the blade shank comprises an anchoring bushing which is adapted to be able to be mounted in a propeller hub.

The blade shank comprises an anchoring bushing which provides the assembly of the blade shank to the hub in cooperation with a shaft of the hub and the assembly of the blade shank in cooperation with the aerodynamic portion. The anchoring bushing has means for anchoring to the hub. The anchoring bushing has fixing means for fixing the aerodynamic portion to the blade shank which are adapted to form said blade shank assembly.

The blade shank assembly, that is to say the assembly of the aerodynamic portion to the blade shank, can be the subject of many variants and can be effected especially by clamping and/or by form-based assembly and/or by assembly by means of attached elements (bolts, screws, etc.) and/or by adhesive bonding and/or by brazing and/or by welding and/or by heat treatment permitting melting of their respective materials at the interfaces, etc.

Advantageously, the blade shank assembly prevents any relative movement of the blade shank and the aerodynamic portion, so that it provides complete fixing of the blade shank and the aerodynamic portion. Accordingly, the blade shank provides both radial blocking of the aerodynamic portion relative to a hub, especially in order to retain it when it is in rotation, and blocking in rotation about the longitudinal axis of the blade (radial relative to the hub) for transmitting and maintaining an adjustment of the pitch of the blade.

Advantageously, a blade according to the invention is also characterised in that:
  the base of the aerodynamic portion comprises at least one root loop,
  the blade shank assembly comprises for each root loop at least one root pin which:
    passes through said root loop,
    is fixedly assembled to the blade shank.

In addition, the passage restriction is advantageously offset along the radial direction relative to the blade shank assembly.

In some embodiments of the invention, the blade shank assembly is a pivot joint. This is the case especially when the assembly comprises a root pin passing through a single root loop having an axis which is orthogonal to the radial direction, so that the aerodynamic portion is blocked in translation in the radial direction, and in rotation about the radial direction, but so that it is free in rotation about the axis of the pivot joint so formed.

Accordingly, as the passage restriction is offset along the radial direction relative to the blade shank assembly, the stops and their buffers block the aerodynamic portion in rotation about the axis of the pivot joint and take up the bending moments and the shear forces of the aerodynamic portion.

This arrangement is particularly advantageous in as much as the axis of the root pin is advantageously orthogonal to the thickness (parallel to the chord) of the aerodynamic portion, so that the aerodynamic portion experiences a high torque about that axis, the aerodynamic forces acting mainly on the intrados and the extrados.

The blade shank assembly according to the invention advantageously comprises at least one root pin for each root loop. More particularly, it advantageously comprises a single root pin passing through each root loop.

Each root pin is anchored—for example by its ends—in the blade shank, especially advantageously in the anchoring bushing. For example, a root pin can be a bolt which passes right through the anchoring bushing and is tightened on each side of the anchoring bushing.

Advantageously and according to the invention, the blade—and more particularly the aerodynamic portion—comprises a single root loop through which there passes a single root pin. Mounting and dismantling, and therefore the manufacture of a blade and the maintenance of a blade, of a propeller, of a turbine engine and of an aircraft according to the invention are therefore simple.

The root loop is advantageously formed at the proximal longitudinal end of the aerodynamic portion, in the base.

Advantageously and according to the invention, at least one root loop forms a safety protuberance.

The root loop is advantageously arranged radially on the inside relative to the passage restriction. Thus, the blade shank assembly is arranged radially on the inside relative to the passage restriction.

The root loop arranged to permit the passage of a root pin through the base of the aerodynamic portion defines a zone of the aerodynamic portion which has the greatest width transversely to the root pin. The root loop thus performs a dual function of anchoring the aerodynamic portion in the blade shank during normal operation and as a safety protuberance during impaired operation, that is to say in the event of rupture of the blade shank assembly.

In other words, the root loop has an overall dimension in at least one retention direction which is greater than the restricted width of at least one passage restriction in that retention direction. In some advantageous embodiments, according to the invention, at least one root pin has a dimension in at least one retention direction (that is to say a width) which is greater than the restricted width of at least one passage restriction in that retention direction. In fact, a root pin is formed of a rigid and resistant material so that, in the event of rupture of the blade shank assembly, the root loop in abutment against the passage restriction (with a thickness of the root loop interposed between the pin and the passage restriction) retains the aerodynamic portion effectively and safely.

Rupture of the blade shank assembly can be due in particular to rupture of the anchoring bushing at the anchoring points of the root pin, and/or to rupture of the root pin, and/or to rupture of the root loop.

In addition, advantageously, a blade according to the invention comprises at least one insert arranged in at least one root loop, said insert having a receiving sleeve for a root loop forming an axis of the blade shank assembly.

The insert is inserted into the root loop and has outside dimensions corresponding to the inside dimensions of the root loop, which it can impose at least in part. Advantageously and according to the invention, the insert is assembled to the root loop, for example by adhesive bonding and/or thermal bonding and/or copolymerisation and/or welding and/or assembly and/or brazing etc. Advantageously and according to the invention, the insert is an element that is rigid in compression, that is to say not deformable under the effect of stresses to which it may be subjected during operation, especially due to the forces applied to the insert by the root loop. The insert accordingly keeps the base—especially the root loop—of the aerodynamic portion in shape.

The inside dimensions of the sleeve of the insert advantageously correspond to the outside dimensions of the root pin which is housed in the sleeve.

The insert advantageously provides the mechanical connection between the root loop and the root pin. In particular, it provides anchoring in the radial direction at least of the aerodynamic portion relative to the root pin.

Advantageously and according to the invention, when the base of the aerodynamic portion comprises a plurality of root loops, each root loop comprises an insert.

A blade according to the invention is further advantageously characterised in that the aerodynamic portion is, at least in part, made of composite material comprising at least a majority of fibres which are unidirectional in the radial direction and are wound inside the base of the aerodynamic portion around said insert to form at least one root loop.

Advantageously and according to the invention, the insert can be formed of a metallic or synthetic material, in particular of a composite material.

Throughout the text, "composite material" denotes any solid synthetic heterogeneous material combining at least two phases. The term denotes especially a material comprising at least a fibrous reinforcement and at least a matrix, the fibrous reinforcement, formed of a first material, being adapted to confer mainly properties of mechanical strength (at least in traction and/or in flexion and/or under shear) to said composite material, and the matrix, formed of at least a second polymer material, effecting shaping, protecting the reinforcement and transmitting certain stresses thereto, and being able to contribute towards the mechanical compressive and/or torsional strength.

The fact of arranging unidirectional fibres forming the fibrous reinforcement of a composite material constituting at least in part the aerodynamic portion in the direction of the span allows the resistance of the aerodynamic portion to forces causing bending of the blade to be optimised. In addition, these unidirectional fibres arranged as a winding around the root pin in the form of the root loop impart very high strength to the blade shank assembly.

Advantageously and according to the invention, said unidirectional fibres are chosen from the group formed of carbon fibres, aramid fibres, carbon-aramid fibres, glass fibres, natural fibres such as hemp or bamboo fibres, metal fibres, and mixtures thereof. Other fibres can be used according to the invention. All lengths of fibres can be envisaged, where appropriate in mixtures.

Advantageously and according to the invention, the aerodynamic portion comprises a membrane and a hollow casing, said membrane being arranged in the hollow casing. The hollow casing provides the aerodynamic function of the blade. In particular, the hollow casing forms the intrados and the extrados and permits a flow of fluid, especially air, around the blade. The membrane serves to maintain the shape of the hollow casing and to anchor it in the blade shank. The membrane comprises, for example, spars and/or ribs. The hollow casing and the membrane are advantageously made of composite material.

Advantageously and according to the invention, each of the parts of the blade is formed of a composite material. However, there is nothing to prevent at least part of the blade, for example the blade shank, from being formed of a non-composite material, for example of a metal alloy.

In addition, advantageously and according to the invention, the different parts of the blade formed of composite material(s) have a polymer matrix composed mainly of at least one compound belonging to the same chemical family, which is therefore common to the polymer matrix of the composite material(s) constituting those different parts. Advantageously and according to the invention, the different parts of the blade formed of composite material(s) comprise the same polymer matrix.

Advantageously and according to the invention, each polymer matrix is chosen from the group formed of epoxy resins, polyurethane resins, phenolic resins, polyester resins, cyanate esters, vinyl ester resins, bismaleimide (BMI) resins, thermoplastics, and mixtures thereof. Other examples are possible.

The invention extends also to a turbine engine propeller comprising at least one blade according to the invention.

A blade according to the invention can advantageously be used in particular on an aircraft turbine engine propeller, in multiple examples. Thus, a turbine engine propeller according to the invention advantageously comprises at least two blades, especially advantageously from three to eight blades, according to the invention. A propeller according to the invention also advantageously comprises a central hub driven by a motor, and generally a device for continuously controlling the pitch of the blades. The central hub has a plurality of radial shafts distributed radially around the hub and in each of which there is mounted a blade shank comprising an anchoring bushing.

In particular, a propeller according to the invention comprising a plurality of blades according to the invention can advantageously be mounted on any type of turbine engine.

A propeller according to the invention utilises the advantages of the blades according to the invention and is therefore particularly safe and simple to maintain, also permitting easy replacement of each blade.

The invention extends also to a turbine engine comprising at least one propeller according to the invention. A turbine engine according to the invention advantageously comprises one or more propellers according to the invention. When the turbine engine comprises a plurality of propellers according to the invention, they can be, for example, counter-rotating.

The invention extends also to an aircraft comprising at least one turbine engine according to the invention. An aircraft comprising one or more turbine engines having propellers comprising blades according to the invention is particularly advantageous. Such an aircraft is particularly safe owing to the safety protuberance and the passage restriction, which are capable of preventing a blade from being ejected in the event of rupture of its blade shank assembly.

The aircraft advantageously comprises one or more turbine engines according to the invention.

The maintenance of such an aircraft is also facilitated by virtue of one or more blades according to the invention.

The invention relates also to a propeller blade, to a turbine engine propeller, to a turbine engine and to an aircraft, characterised in combination by all or some of the features mentioned hereinabove or herein below.

The invention extends also to a method of assembling a blade, wherein:

an aerodynamic portion having a part, named the base, is introduced into a blade shank through a mounting opening of said blade shank, said mounting opening having a dimension, named the opening width, in any direction, named the tangential direction, orthogonal to a direction, named the radial direction, corresponding to a centrifugal direction when the blade is driven in rotation with the blade shank anchored to a rotating hub, said opening width being greater than the overall dimension of the base, so that the base can be mounted in the blade shank by being passed in the radial direction through the mounting opening, the aerodynamic portion is assembled by an assembly, named the blade shank assembly, to the blade shank at least in said radial direction, at least one passage restriction forming a restriction of the opening width is formed in the blade shank in at least one direction, named the retention direction, orthogonal to the radial direction, said passage restriction having, in said retention direction, a dimension, named the restricted width, allowing a section of the aerodynamic portion to be housed once the base of the aerodynamic portion has been introduced into the blade shank radially on the inside relative to said passage restriction, said base of the aerodynamic portion having an overall dimension in said retention direction which is strictly greater than said restricted width so that, in the event of rupture of the blade shank assembly, the base is able to come into abutment in said radial direction against the passage restriction so as to retain the aerodynamic portion in the blade shank at least in said radial direction.

The invention thus allows the assembly of a blade and/or a propeller to be simplified, as well as the maintenance thereof. In particular, it allows the replacement of an aerodynamic portion alone or of a blade shank alone of a blade to be simplified.

Advantageously and according to the invention, said passage restriction is formed in the mounting opening by the mounting of:

a first stop, named the intrados stop, arranged on the side of an intrados of the aerodynamic portion, and a second stop, named the extrados stop, arranged on the side of an extrados of the aerodynamic portion.

Each stop is advantageously removably assembled to the blade shank. Thus, simple and non-destructive dismantling of the stops is provided, so as to allow the base of the aerodynamic portion to be removed from the blade shank, especially from a receiving housing formed by the blade shank, and the base of that aerodynamic portion or of a different aerodynamic portion to be reintroduced.

A method of assembly according to the invention makes it possible to obtain a blade which is a particularly safe and simple to maintain.

BRIEF DESCRIPTION OF THE DRAWINGS

Other objects, features and advantages of the invention will become apparent upon reading the following description, which is given without implying any limitation and which refers to the accompanying drawings, in which.

DETAILED DESCRIPTION OF THE INVENTION

Figure 1:
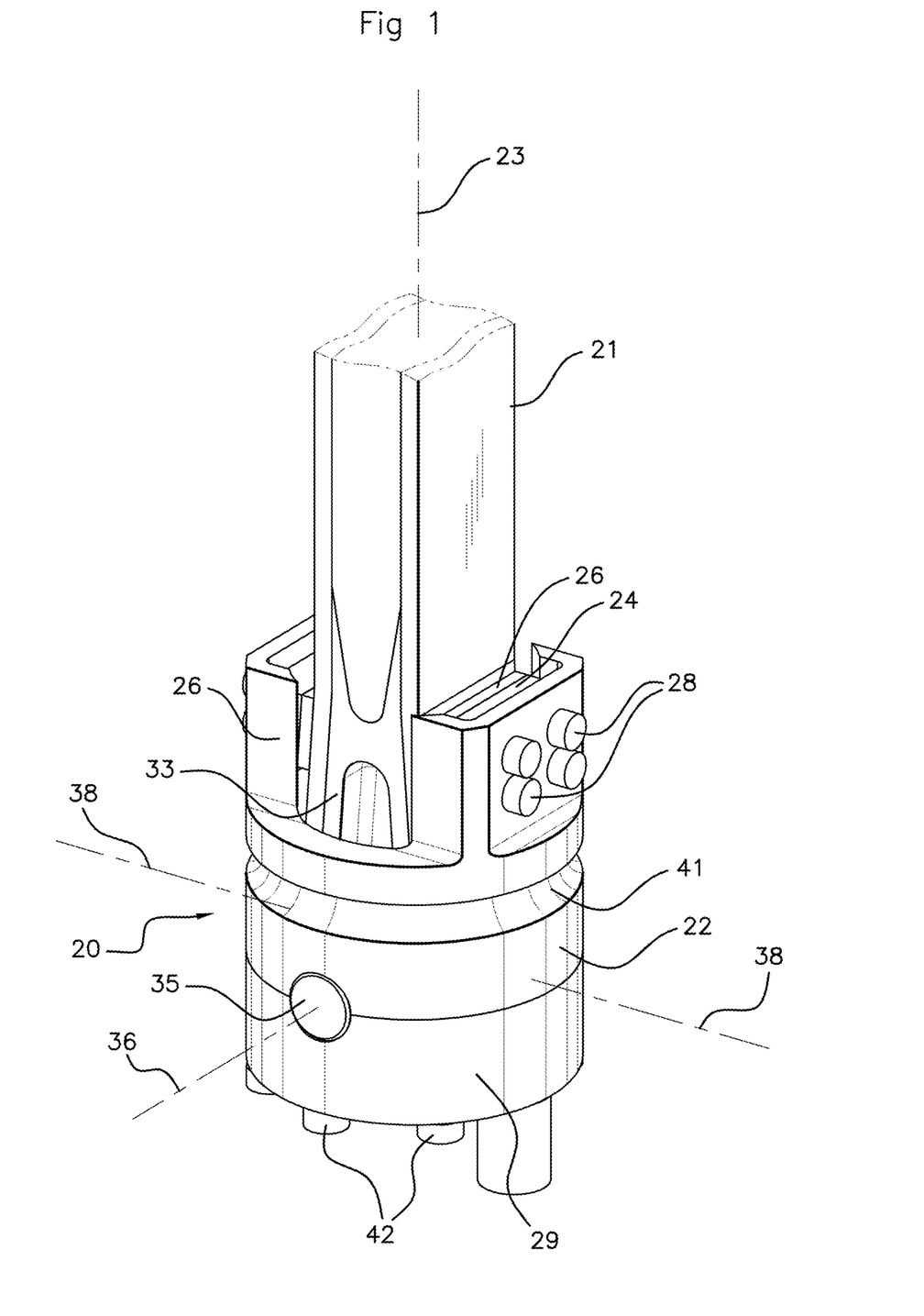
FIG. 1 is a schematic perspective view of the shank and of an aerodynamic portion of a blade according to an embodiment according to the invention.
Figure 2:
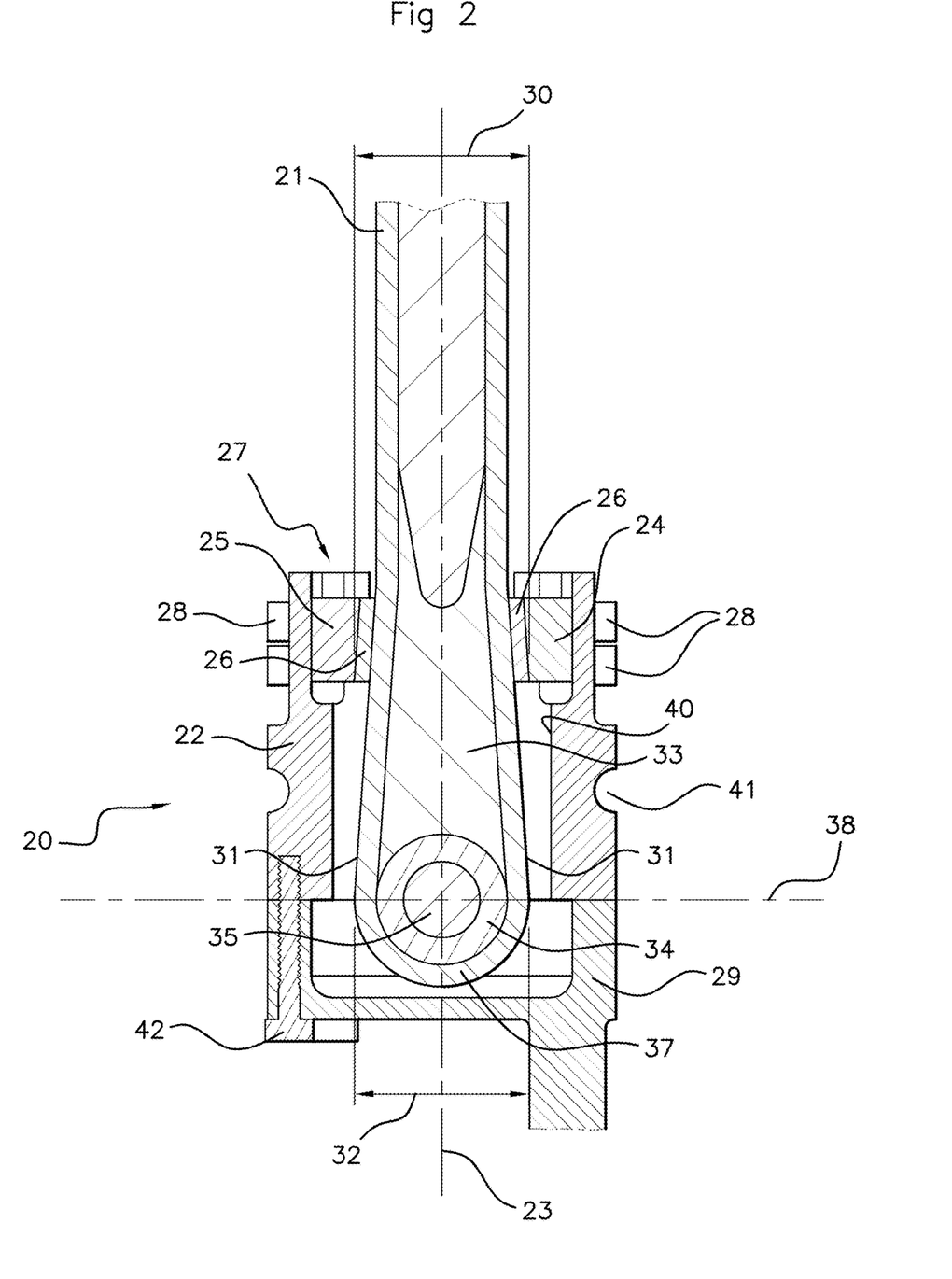
FIG. 2 is a schematic sectional view in a radial plane orthogonal to the axis of the root pin of the blade of FIG. 1.
Figure 3:
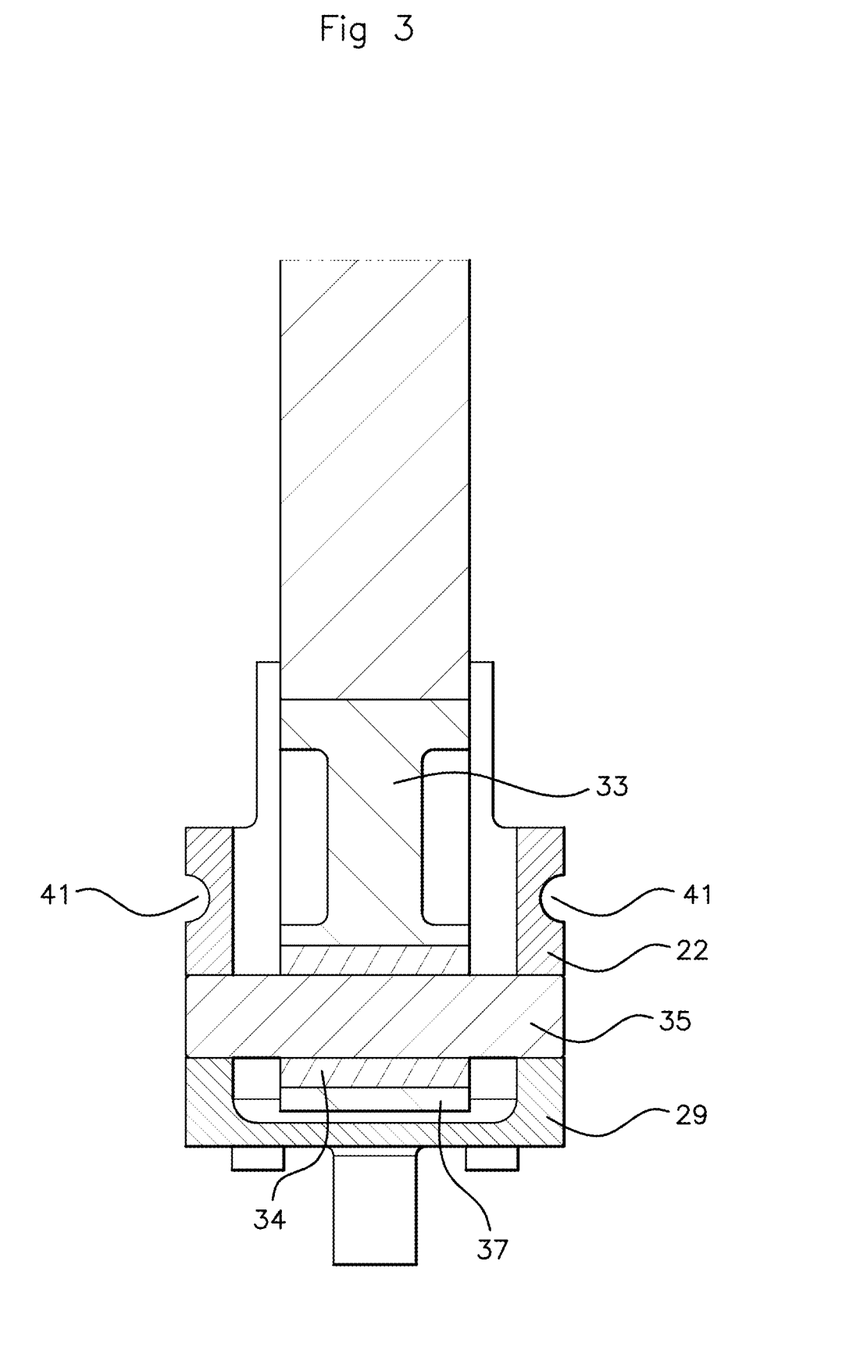
FIG. 3 is a schematic sectional view in a radial plane including the axis of the root pin of the blade of FIG. 1.

An aeroplane turbine engine propeller blade according to the invention shown in the figures comprises a blade shank 20 and an aerodynamic portion 21, part of which, named the base, extends into the blade shank, the aerodynamic portion 21 passing through an opening, named the mounting opening 27, of the blade shank.

The blade shank 20 comprises a hollow anchoring bushing 22 of generally cylindrical shape about a radial direction 23 corresponding to a direction of the centrifugal forces applied to the blade when it is driven in rotation with the blade shank anchored in a rotating hub. The radial direction therefore corresponds substantially to the span of the blade. The anchoring bushing 22 has, in the radial direction 23, a proximal end closed by a cover 29 and an open distal end forming said mounting opening 27.

The blade shank 20 further comprises an intrados stop 24 and an extrados stop 25 which are removably mounted on the anchoring bushing, for example by screws 28, in the mounting opening 27, so as to restrict the width thereof and form a passage restriction 30 in a direction, named the retention direction 38, orthogonal to the radial direction 23. In the following, the term width and its derivatives refer, unless indicated otherwise, to a dimension in the retention direction 38. The passage restriction 30 therefore has a restricted width relative to the width of the mounting opening 27 in the retention direction 38.

The anchoring bushing 22 forms a receiving housing 40 for the base of the aerodynamic portion 21, the internal dimensions of the receiving housing 40 being adapted to allow the base to the housed in the housing 40. In particular, the width of the receiving housing 40 is greater than or equal to the overall dimension in terms of width of the base of the aerodynamic portion 21. The receiving housing 40 is delimited radially outwardly by the passage restriction 30. The mounting opening 27 also preferably has internal dimensions which are adapted to permit the passage of the base through the mounting opening 27 when it is fitted in the receiving housing 40. In particular, the mounting opening 27 has a width in the retention direction 38 which is greater than the overall dimension in terms of width of the base of the aerodynamic portion 21.

It is thus simple, by dismantling the stops 24, 25, to remove and introduce the aerodynamic portion in order to replace it, inspect it or repair it.

The base of the aerodynamic portion 21 therefore extends radially on the inside relative to the passage restriction 30 and has a safety protuberance 31 of outside dimension 32 (overall dimension in terms of width) in said retention direction 38 which is strictly greater than the restricted width of the passage restriction 30 in said retention direction.

For example, the outside width 32 of the safety protuberance 31 is 32 mm and the restricted width of the passage restriction 30 is 22 mm.

The safety protuberance 31 of the base of the aerodynamic portion is formed by a root loop 37 of the base of the aerodynamic portion. In particular, the root loop 37 is formed by the proximal end of a spar forming part of the membrane of the aerodynamic portion.

The root loop 37 receives an insert 33 having a sleeve 34 which passes through it axially, in which there is mounted a root pin 35.

The root pin 35 is a straight rigid rod which extends in a longitudinal direction defining an axis 36 of the blade shank assembly. The root pin 35 is mounted by its two ends in root housings formed in the anchoring bushing 22, preferably between the proximal end of the anchoring bushing 22 and the cover 29 fixed thereto by screws 42. The longitudinal direction of the root pin 35 is orthogonal to the radial direction 23 and orthogonal to the retention direction 38. The same is true of the axis 36 of the blade shank assembly defined by the root pin 35.

The root loop 37, the insert 33, the root pin 35 and the root housings form the blade shank assembly, that is to say the assembly of the aerodynamic portion in the blade shank.

The overall dimension in terms of width of the base of the aerodynamic portion 21 is defined by the root pin 35, the thickness of the root loop 37 and by the insert 33. Preferably, the overall dimension in terms of width is imposed by the root pin 35 and by the insert 33, which are elements that are rigid in compression. Preferably, the width of the root pin 35 and/or the maximum width of the insert 33 is strictly greater than said restricted width of the passage restriction 30.

Each stop 24, 25 is equipped with a member, named a buffer 26, arranged between the aerodynamic portion 21 and said stop 24, 25.

The buffers 26 are advantageously formed of shoes which are fixed to the end of each stop and are made of a viscoelastic material, for example of an elastomer material.

The stops 24, 25 and the buffers 26 block the aerodynamic portion 21 in rotation about the axis 36 defined by the root pin 35. They allow the bending moments and shear forces of the aerodynamic portion 21 to be absorbed.

The stops 24, 25 have stop faces which are sloping relative to the radial direction 23. The buffers 26 have faces in contact with the aerodynamic portion which are also sloping relative to the radial direction 23. The slope of each stop advantageously corresponds to a slope of the portion of the base of the aerodynamic portion 21 which comes into contact with said intrados stop 24 and with said extrados stop 25 in the event of rupture of the blade shank assembly.

The slope of the stops 24, 25 is chosen to absorb the forces exerted by the aerodynamic portion on the blade shank in the event of rupture of the blade shank assembly, in the radial direction 23. The slope of the stops 24, 25 is, for example, advantageously between 5° and 45°, in particular advantageously approximately 10 degrees.

Furthermore, the buffers 26 and/or the assembly thereof to the stops 24, 25 are adapted so that, in the event of rupture of the blade shank assembly, the buffers 26 do not provide radial retention 23 for the aerodynamic portion. The buffers 26 can, for example, be adhesively bonded to the stops or simply interposed between the stops and the aerodynamic portion or assembled to the stops by conjugate forms of the buffers and of the stops. In other words, the buffers 26 do not participate in the passage restriction, the restricted width of the passage restriction being defined between the opposing inside faces of the two stops 24, 25, without taking the buffers 26 into account.

Accordingly, there is a strictly positive gap, defined by the thickness of the buffers 26, between the passage restriction 30 and the safety protuberance 31 in the radial direction 23 so that, in the event of rupture of the blade shank assembly, the aerodynamic portion 21 is displaced in the radial direction 23 until it is in abutment against the intrados stop 24 and against the extrados stop 25, ejecting the buffers 26.

In addition, the anchoring bushing 22 advantageously has ball tracks 41 so that it can be mounted in a hub for anchoring the blade (in particular the blade shank) in the hub in said radial direction 23 and while permitting adjustment of the pitch of the blade by rotation thereof about the radial direction 23. Other rolling elements can be envisaged.

The spar of the aerodynamic portion forming the root loop 37 is composed of a composite material, preferably comprising a reinforcement of carbon fibres which are arranged longitudinally along the span (in the radial direction 23) of the blade in an epoxy resin matrix, said carbon fibres being wound in the base to form the root loop 37.

A blade according to the invention is assembled as follows. The aerodynamic portion 21 is introduced into the anchoring bushing 22 by passing the base of said aerodynamic portion (21) through the mounting opening 27. The two stops 24, 25 equipped with their shoes 26 of elastomer are fixed in the mounting opening 27 by the screws 28 in order to form the passage restriction. The root pin 35 is inserted into the sleeve 34 of the insert 33 and into the parts of the root housings formed by the anchoring bushing 22. The cover 29 is then screwed onto the anchoring bushing 22 in order rigidly to block the root pin 35, preferably by applying a clamping force to the root pin 35. The dimensions of the various elements are preferably adjusted so that the buffers 26 of the stops 24, 25 are biased slightly in compression.

The insert 33 is also advantageously made of a moulded composite material comprising a reinforcement of carbon fibres in an epoxy resin matrix.

The intrados stop 24 and the extrados stop 25 are preferably made of metal, for example of titanium alloy. The anchoring bushing is preferably made of metal, for example of steel alloy.

A blade according to the invention is particularly simple, has a single axis and a single receiving sleeve for that axis (sleeve 34), permitting precise adjustment and easy mounting, minimising problems of adjustment between the various elements. It is particularly light-weight, it being possible to produce most of the constituent elements, which are limited in number, from composite material. The damping shoes 26 are removable and easily replaceable. The aerodynamic portion 21 is independent of the blade shank assembly from the point of view of these components and the transmission of forces, and can be of any type, the invention being applicable to all types and forms of blades. The blade shank assembly allows a slight preload to be applied to the axis 36. The geometry of the different elements is particularly simple and facilitates their manufacture, in particular as regards the anchoring bushing 22 and the insert 33. The number of elements adhesively bonded to one another is minimal, the transfer of forces taking place principally by compression. The loss of a blade is not possible unless the blade shank assembly is ruptured at least twice, so that a blade according to the invention withstands a single rupture.

The invention can be the subject of many other variants which are not shown.

In particular, there is nothing to prevent the blade shank assembly from being arranged radially on the outside of the intrados stop 24 and extrados stop 25 since the aerodynamic portion always has a protuberance radially on the inside of said stops.

The anchoring bushing can be in one piece.

The invention claimed is:
1. A blade comprising:
a blade shank,
an aerodynamic portion, having a part, named the base, extending into the blade shank,
an assembly, named the blade shank assembly, of the aerodynamic portion to the blade shank, said blade shank assembly retaining the aerodynamic portion in a direction, named the radial direction, corresponding to a centrifugal direction when the blade is driven in rotation with the blade shank anchored to a rotating hub,
wherein:

the blade shank comprises a mounting opening having a dimension, named the opening width, in any tangential direction orthogonal to the radial direction, which is greater than an overall dimension of the base, so that the base can be mounted in the blade shank by being passed in the radial direction through the mounting opening, the blade shank comprises at least one stop forming a passage restriction forming a restriction of the opening width in at least one direction, named the retention direction, orthogonal to the radial direction, said passage restriction having, in said retention direction, a dimension, named the restricted width, allowing a section of the aerodynamic portion to be housed therein, the base of the aerodynamic portion extends radially on the inside relative to said passage restriction and has an overall dimension in said retention direction which is strictly greater than said restricted width, with a strictly positive gap in the radial direction between the base and said at least one stop, only the blade shank assembly providing radial anchoring of the aerodynamic portion in the blade shank under normal operating conditions of the blade, the blade shank comprises, between the aerodynamic portion and each one of said at least one stop, a buffer adapted to provide local blocking of the aerodynamic portion in said retention direction without preventing the blade from being displaced in the radial direction in the event of rupture of the blade shank assembly, so that, in the event of rupture of the blade shank assembly, said passage restriction is able to retain the aerodynamic portion in the blade shank in said radial direction.

2. The blade according to claim 1, wherein said at least one stop is removably assembled to the blade shank.

3. The blade according to claim 2, wherein the blade shank comprises, in the mounting opening:
a first stop, named the intrados stop, arranged on the side of an intrados of the aerodynamic portion,
a second stop, named the extrados stop, arranged on the side of an extrados of the aerodynamic portion,
the intrados stop and the extrados stop forming said passage restriction.

4. The blade according to claim 3, further comprising:
at least one member, named an intrados buffer, between the aerodynamic portion and the intrados stop, and at least one member, named an extrados buffer, between the aerodynamic portion and the extrados stop, each of said intrados buffer and extrados buffer being adapted to provide local blocking of the aerodynamic portion in at least a direction orthogonal to the radial direction.

5. The blade according to claim 1, wherein said at least one stop comprises, in the mounting opening:
a first stop, named the intrados stop, arranged on the side of an intrados of the aerodynamic portion,
a second stop, named the extrados stop, arranged on the side of an extrados of the aerodynamic portion,
the intrados stop and the extrados stop forming said passage restriction.

6. The blade according to claim 5, wherein said buffer comprises:
at least one buffer, named an intrados buffer, between the aerodynamic portion and the intrados stop, and at least one buffer, named an extrados buffer, between the aerodynamic portion and the extrados stop, each of said intrados buffer and extrados buffer being adapted to provide local blocking of the aerodynamic portion in a direction orthogonal to the radial direction.

7. The blade according to claim 6, wherein each buffer is mounted with a compressive stress between the aerodynamic portion and the corresponding one of said at least one stop, said compressive stress being adapted so that any resonance frequency of the blade is distinct from mechanical excitation frequencies under use conditions of the blade.

8. The blade according to claim 5, further comprising:
between the aerodynamic portion and said at least one stop, a deformable member which is adapted to absorb at least partially an energy of an impact to which said aerodynamic portion is subjected.

9. A blade according to claim 8, wherein said deformable member is arranged on said buffer.

10. The blade according to claim 1, wherein said at least one stop forms a passage restriction of decreasing cross-section in the radial direction in the direction of a free end of the blade.

11. The blade according to claim 1, wherein the base has at least one safety protuberance defining the overall dimension of the base in said retention direction.

12. The blade according to claim 1, wherein the blade shank comprises an anchoring bushing which is adapted to be able to be mounted in a propeller hub.

13. The blade according claim 1, wherein:
the base of the aerodynamic portion comprises at least one root loop, and
the blade shank assembly comprises, for each root loop, at least one root pin which:
passes through said root loop, and
is fixedly assembled to the blade shank.

14. The blade according to claim 13, wherein the base has at least one safety protuberance defining the overall dimension of the base in at least one retention direction, and at least one root loop forms the at least one safety protuberance.

15. The blade according to claim 13, wherein the blade further comprises:
at least one insert arranged in at least one root loop, said insert having a receiving sleeve for at least one root pin.

16. The blade according to claim 15, wherein the aerodynamic portion is, at least in part, made of composite material comprising at least a majority of fibres unidirectional extending in the radial direction and wound inside the base of the aerodynamic portion around said insert to form at least one root loop.

17. A turbine engine propeller comprising at least one blade according to claim 1.

18. A turbine engine comprising at least one propeller according to claim 17.

19. An aircraft comprising at least one turbine engine according to claim 18.

20. A blade according to claim 1, wherein each buffer is made of a viscoelastic material.

21. A blade according to claim 1, wherein each buffer has a compression stiffness that is greater than a shear stiffness of said buffer.

22. A blade according to claim 1, wherein each buffer has a compression stiffness lower than the compression stiffness of the aerodynamic portion and lower than the compression stiffness of said at least one stop.

23. A blade according to claim 1, wherein said blade shank assembly is a pivot joint.

24. A blade according to claim 23, wherein said passage restriction is offset along the radial direction relative to said blade shank assembly.

25. A method of assembling a blade, comprising:

introducing an aerodynamic portion having a part, named the base, into a blade shank through a mounting opening of said blade shank, said mounting opening having a dimension, named the opening width, in any direction, named the tangential direction, orthogonal to a direction, named the radial direction, corresponding to a centrifugal direction when the blade is driven in rotation with the blade shank anchored to a rotating hub, said opening width being greater than an overall dimension of the base, so that the base can be mounted in the blade shank by being passed in the radial direction through the mounting opening, assembling the aerodynamic portion by an assembly, named the blade shank assembly, to the blade shank at least in said radial direction, at least one step of forming a passage restriction forming a restriction of the opening width in at least one direction, named the retention direction, orthogonal to the radial direction, said at least one passage restriction having, in said retention direction, a dimension, named the restricted width, allowing a section of the aerodynamic portion to be housed once the base of the aerodynamic portion has been introduced into the blade shank radially on the inside relative to said at least one passage restriction, said blade having a strictly positive gap in the radial direction between the base said passage restriction, only the blade shank assembly providing radial anchoring of the aerodynamic portion in the blade shank under normal operating conditions of the blade, said blade shank having a buffer between the aerodynamic portion and said passage restriction, each buffer being adapted to provide local blocking of the aerodynamic portion in said retention direction without preventing the blade from being displaced in the radial direction, said base of the aerodynamic portion having an overall dimension in said retention direction which is strictly greater than said restricted width so that, in the event of rupture of the blade shank assembly, said passage restriction is able to retain the aerodynamic portion in the blade shank in said radial direction.

* * * * *